C. W. LYNCH.
ATTACHMENT FOR SAWMILL DOGS.
APPLICATION FILED SEPT. 28, 1915.
1,228,332.
Patented May 29, 1917.
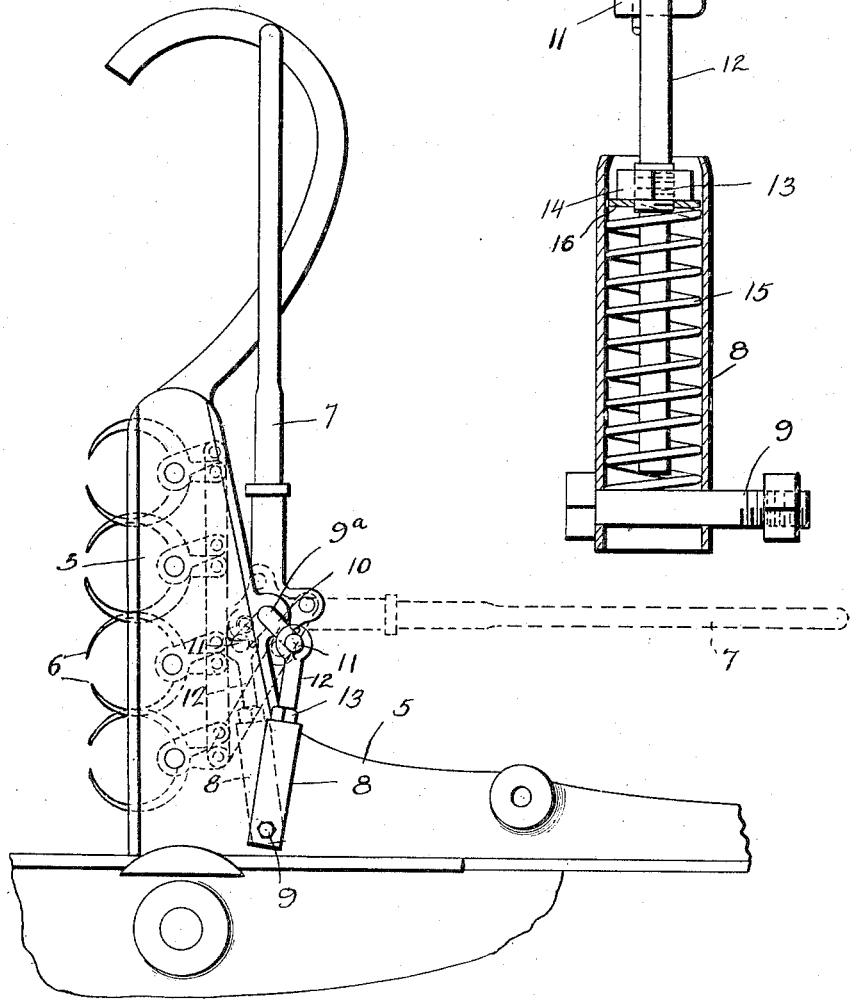
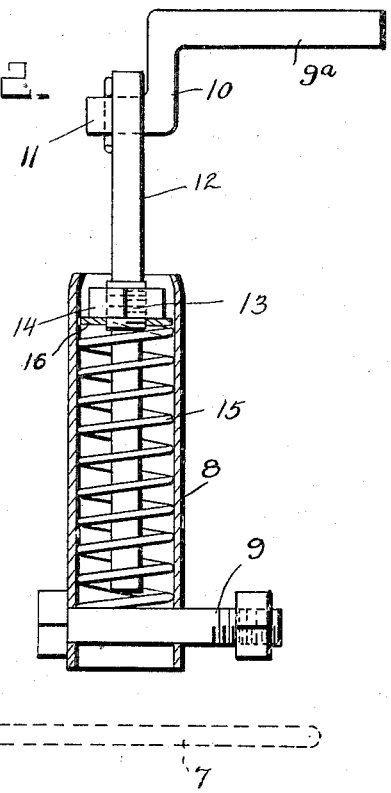

UNITED STATES PATENT OFFICE.

CHARLEY W. LYNCH, OF TRINITY, TEXAS.

ATTACHMENT FOR SAWMILL-DOGS.

1,228,332.   Specification of Letters Patent.   Patented May 29, 1917.

Application filed September 28, 1915. Serial No. 53,064.

*To all whom it may concern:*

Be it known that I, CHARLEY W. LYNCH, a citizen of the United States, residing at Trinity, in the county of Trinity and State of Texas, have invented certain new and useful Improvements in Attachments for Sawmill-Dogs; and I do hereby declare the following to be a full, clear, and exact description of the invention, such as will enable others skilled in the art to which it appertains to make and use the same.

This invention relates to sawmill dogs, and has for its primary object to provide a simple and efficient device for retaining the actuating lever of a lever mechanism in adjusted position.

With this and other objects in view, the invention consists in the novel construction, arrangement and formation of parts as will be hereinafter specifically described, claimed and illustrated in the accompanying drawing, in which:

Figure 1 represents a side elevation of a sawmill dog of the usual type illustrating the invention applied to use.

Fig. 2 represents a vertical central sectional view through the device.

Referring to the drawing in detail, wherein similar reference numerals designate corresponding parts throughout the several views, the numeral 5 indicates one of the side plates of the body of a sawmill dog of the usual or any preferred construction including a plurality of pivoted log-engaging dogs 6 and an actuating lever 7 therefor connected with the dogs 6 by the mechanism indicated in dotted lines in Fig. 1 of the drawing for moving the dogs into and out of their engaging position. As various forms of log-engaging dogs 6 and actuating means for connecting the operating lever with the dogs 6 may be employed, and as such mechanism does not constitute a portion of the present invention, further illustration and description thereof are deemed unnecessary.

The invention contemplates the provision of means for locking or retaining the lever 7 in vertical or horizontal position, as shown in full and dotted lines in Fig. 1 and consists in a cylinder 8 having diametrically opposed apertures in the lower end rotatably receiving a bolt 9 by which the cylinder is pivotally secured to the base portion of the body 5. The lever 7 is non-rotatably secured upon a shaft 9ª rotatably mounted in the body 5 and having an angularly directed crank arm 10 and crank pin 11. A rod 12 is slidably mounted in the cylinder 8, is pivotally connected at its upper end with the crank pin 11 and is formed centrally with an enlarged screwthreaded portion 13 on which is fitted a nut 14. A spiral spring 15 is coiled about the rod 12 and is engaged at one end with a washer 16 and at its opposite end with the bolt 9.

The crank arm 10 is disposed at such an angle, with relation to the lever 7, that the tension of the spring 15 retains said lever in either vertical or horizontal position.

While I have shown my invention attached to a sawmill dog at a point below the actuating lever, it will be understood that the device may be attached to the sawmill dog in any desired position.

What I claim is:

1. The combination with a sawmill dog including an upright body side plate, and an operating lever for the saw mill dog located at a point intermediate of the ends of the said side plate and arranged to swing upwardly and downwardly to and from a vertical and a horizontal position for operating the saw mill dog, of an exteriorly arranged attachment for holding the operating lever in either position, said attachment comprising a horizontal shaft forming a pivot for the lever and adapted to be substituted for the ordinary pivot of a sawmill dog and having a crank arranged exteriorly of the said side plate, a substantially upright tubular casing provided at the lower end with a transverse pivot bolt piercing the casing and the said side plate for securing the casing to the same, the upper end of the casing being open, a coiled spring located within the casing and seated upon the bolt, and a rod connected to the crank and extending into the open end of the casing and provided with means for engaging the spring to compress the same when the operating lever is oscillated in either direction, whereby the spring will hold the lever in either position.

2. The combination with a sawmill dog including an upright body side plate, an operating lever for the saw mill dog located at a point intermediate of the ends of the body and arranged to swing upwardly and downwardly to and from a vertical and a horizontal position for operating the saw mill dog, of an exteriorly arranged attachment for holding the lever in either position, said attachment comprising a horizontal shaft forming a pivot for the operating lever and adapted to be substituted for the ordinary pivot of such a lever and having a crank located exteriorly of the side plate, said crank being set at an obtuse angle to the lever and extending downwardly from the shaft, an exteriorly arranged cylindrical casing located below the shaft in substantially an upright position and having a contracted upper end, a pivot bolt piercing the lower end of the casing and the side plate and arranged in vertical alinement with the said shaft, a coiled spring housed within the casing and seated upon the bolt, a rod connected to the upper end of the crank and extending into the casing and having an enlarged threaded portion, a nut arranged on the threaded portion, and a washer mounted on the rod and engaged by the nut and bearing against the upper end of the spring to compress the same when the lever is oscillated, whereby the lever is held in either position, said washer being of greater diameter than the contracted end of the casing so as to retain the spring therein when the rod is disconnected from the shaft and the said bolt confining the spring at the lower end of the said casing.

In testimony whereof I affix my signature in presence of two witnesses.

CHARLEY W. LYNCH.

Witnesses:
 R. E. BENSON,
 N. STANDLEY.

Copies of this patent may be obtained for five cents each, by addressing the "Commissioner of Patents, Washington, D. C."